(12) United States Patent
Otto

(10) Patent No.: US 10,202,699 B2
(45) Date of Patent: Feb. 12, 2019

(54) FUEL CELL SYSTEM FOR GENERATING ENERGY AND WATER

(71) Applicant: Airbus Operations GmbH, Hamburg (DE)

(72) Inventor: Thorsten Otto, Hamburg (DE)

(73) Assignee: Airbus Operations GmbH (DE)

( * ) Notice: Subject to any disclaimer, the term of this patent is extended or adjusted under 35 U.S.C. 154(b) by 1251 days.

(21) Appl. No.: 13/903,432

(22) Filed: May 28, 2013

(65) Prior Publication Data

US 2013/0252118 A1 Sep. 26, 2013
US 2014/0113207 A9 Apr. 24, 2014

Related U.S. Application Data

(63) Continuation of application No. PCT/EP2011/070714, filed on Nov. 22, 2011.

(60) Provisional application No. 61/417,527, filed on Nov. 29, 2010.

(30) Foreign Application Priority Data

Nov. 29, 2010 (DE) ........................ 10 2010 052 839

(51) Int. Cl.
| | |
|---|---|
| C25B 5/00 | (2006.01) |
| B64D 11/02 | (2006.01) |
| B64D 41/00 | (2006.01) |
| H01M 8/04119 | (2016.01) |
| H01M 8/04291 | (2016.01) |
| H01M 8/04313 | (2016.01) |
| H01M 8/04492 | (2016.01) |
| H01M 8/04694 | (2016.01) |
| H01M 8/04828 | (2016.01) |
| H01M 8/04992 | (2016.01) |

(52) U.S. Cl.
CPC ............... *C25B 5/00* (2013.01); *B64D 11/02* (2013.01); *B64D 41/00* (2013.01); *H01M 8/04164* (2013.01); *H01M 8/04291* (2013.01); *H01M 8/04313* (2013.01); *H01M 8/04492* (2013.01); *H01M 8/04694* (2013.01); *H01M 8/04828* (2013.01); *H01M 8/04992* (2013.01); *B64D 2041/005* (2013.01); *H01M 2250/20* (2013.01); *Y02E 60/566* (2013.01); *Y02T 50/44* (2013.01); *Y02T 50/46* (2013.01); *Y02T 90/32* (2013.01); *Y02T 90/36* (2013.01)

(58) Field of Classification Search
CPC .. B64D 11/02; B64D 41/00; B64D 2041/005; H01M 8/04164; H01M 8/04291; H01M 8/04313; H01M 8/04492; H01M 8/04694; H01M 8/04828; H01M 8/04992; H01M 2250/20; C25B 5/00
See application file for complete search history.

(56) References Cited

U.S. PATENT DOCUMENTS

| | | |
|---|---|---|
| 6,296,957 B1 | 10/2001 | Graage |
| 6,815,106 B1 | 11/2004 | Salvador et al. |
| 7,648,628 B2 | 1/2010 | Hoffjann et al. |
| 7,935,447 B2 | 5/2011 | Wolff et al. |
| 2005/0084723 A1 | 4/2005 | Mori |
| 2006/0138278 A1 | 6/2006 | Gans |
| 2008/0032164 A1* | 2/2008 | Kratschmar et al. ........... 429/13 |
| 2008/0038604 A1* | 2/2008 | Matsubayashi et al. ....... 429/23 |
| 2008/0176111 A1 | 7/2008 | Schaffnit et al. |
| 2010/0071371 A1* | 3/2010 | Arendt et al. ................... 60/706 |

FOREIGN PATENT DOCUMENTS

| | | |
|---|---|---|
| DE | 198 21 952 A1 | 11/1999 |
| DE | 101 18 151 A1 | 12/2001 |
| DE | 10 2004 028 036 A1 | 1/2006 |
| DE | 10 2006 034 814 A1 | 1/2008 |
| DE | 10 2008 004 701 A1 | 8/2008 |
| DE | 10 2007 014 616 A1 | 9/2008 |
| WO | 00/42671 A1 | 7/2000 |

\* cited by examiner

*Primary Examiner* — Muhammad S Siddiquee
(74) *Attorney, Agent, or Firm* — Lerner, David, Littenberg, Krumholz & Mentlik, LLP

(57) ABSTRACT

Fuel cell systems aboard means of transport can be used for generating energy and for producing water. In order to reduce the overall weight of the system, the fuel cell is controlled or regulated in dependence on a current fill level or a limit level of the water tank, as well as a predicted future water consumption. In this way, it may be possible to minimize the water quantity to be stored in the water tank.

13 Claims, 9 Drawing Sheets

| $V_T$ | $\dot{V}_V$ | Catering | $\dot{V}_{G,Soll}$ ||| $\dot{V}_{G,Soll}$ |
|---|---|---|---|---|---|---|
| | | | No water generation | Average water generation | Max. water generation | |
| 0 | | | x | | | 0 |
| 1 | 0 | 0 | x | | | 0 |
| 1 | 0 | 1 | | x | | 1 |
| 1 | 1 | 0 | | x | | 1 |
| 1 | 1 | 1 | | | x | 2 |
| 2 | 0 | 0 | | x | | 1 |
| 2 | 0 | 1 | | | x | 2 |
| 2 | 1 | 0 | | | x | 2 |
| 2 | 1 | 1 | | | x | 2 |

| $V_T$ | | $\dot{V}_V$ | | Catering | |
|---|---|---|---|---|---|
| 0 | $V_T > V_{T_o}$ | 0 | $\dot{V}_V < \dot{V}_{V\,Krit}$ | 0 | No catering planned |
| 1 | $V_{T_u} < V_T < V_{T_o}$ | 1 | $\dot{V}_V > \dot{V}_{V\,Krit}$ | 1 | Catering planned |
| 2 | $V_T < V_{T_u}$ | | | | |

Fig. 7

| $\dot{V}_{G,Soll}$ | K | $P_{W,Soll}$ |
|---|---|---|
| 0 | | 0 |
| 1 | 1 | 1 |
| 1 | 0 | 2 |
| 2 | | 2 |

| $\dot{V}_{G,Soll}$ | Water generation |
|---|---|
| 0 | None |
| 1 | Average |
| 2 | Maximum |

| K | |
|---|---|
| 0 | $K < K_{Krit}$ |
| 1 | $K > K_{Krit}$ |

| $P_{W,Soll}$ | Performance demand | |
|---|---|---|
| 0 | None | 0 |
| 1 | Average | $P_{BZ\,opt}$ |
| 2 | Maximum | $P_{BZ\,max}$ |

Fig. 8A

FUEL CELL SYSTEM FOR GENERATING ENERGY AND WATER

CROSS-REFERENCE TO RELATED APPLICATIONS

The present application is a continuation of International Patent Application No. PCT/EP2011/070714, filed Nov. 22, 2011, which claims priority from German Patent Application No. 10 2010 052 839.0 filed Nov. 29, 2010, and which claims the benefit of the filing date of U.S. Provisional Patent Application No. 61/417,527 filed Nov. 29, 2010, all of which are hereby incorporated herein by reference.

FIELD OF THE INVENTION

The invention pertains to fuel cell systems. The invention particularly pertains to a fuel cell system for generating electric energy and water for use aboard a means of transport, to a method for generating electric energy and water aboard a means of transport by means of a fuel cell system, to a means of transport with a fuel cell system, as well as to the use of a fuel cell system for supplying energy to electric consumers and for producing fresh water aboard a means of transport.

TECHNICAL BACKGROUND

Fuel cell systems aboard aircraft are not only able to generate electric energy, but also water by cooling the hot and humid fuel cell waste gas in a condenser and subsequently separating the condensed water from the waste gas in a water separator.

DE 10 2006 034 814 B1 and US 2008179050 A1 describe conventional fuel cell systems aboard aircraft.

The control of the fuel cell system may be based on the respective electric power demand.

The water produced by the fuel cell may furthermore be intermediately stored in a tank and fed to the water consumers aboard the aircraft in case of need.

The water tank needs to have corresponding dimensions in order to ensure that a sufficient quantity of water is always available.

BRIEF SUMMARY OF THE INVENTION

An aspect of the invention may be seen in proposing a fuel cell system that is characterized by a reduced overall weight.

According to a first aspect of the invention, a fuel cell system for generating electric energy and water for use aboard a means of transport is proposed, wherein said fuel cell system features a fuel cell, a water tank and a control or regulating device. The water tank serves for storing water delivered by the fuel cell. For example, the fuel cell emits hot and humid fuel cell waste gas that is subsequently cooled. The thusly condensed water can then be collected in the water tank.

The control or regulating device serves for controlling or regulating the fuel cell in dependence on a current fill level of the water tank or in dependence on a current limit level of the water tank and/or a predicted future water consumption.

Consequently, the quantity of water being produced may not or at least not only be dependent on the power demand of the electric loads aboard the means of transport. It may be possible, in particular, to control or regulate the water production rate independently of the power demand of the electric loads, i.e. the electric consumers.

The control or regulation of the fuel cell system for supplying the water system may make it possible to adapt the operation of the fuel cell system in dependence on the water demand such that the quantity of water to be stored in the tank can be minimized. This may result in a reduction of the overall weight of the fuel cell system and therefore the means of transport. The thusly achieved reduction of the size of the water tank may also make it possible to reduce the required installation space for the fuel cell system.

The instantaneous water tank fill level, the previous water consumption and the anticipated, predicted water demand can be taken into account in the control or regulation of the fuel cell system such that the fuel cell may, if applicable, even be operated at its optimal operating point of, for example, about 30 to 50% of the maximum load during the entire flight or at least a significant portion of the flight. In this way, electric energy is generated with the highest electrical efficiency possible and a long service life of the fuel cell is simultaneously achieved.

According to another embodiment of the invention, the control or regulating device features a fill level control or regulating device with a fill level sensor or a limit level sensor for determining a fill level or a limit level in the water tank.

Due to the measurement of the current fill level or the limit level, it may be possible to determine if and at which rate the water tank needs to be filled.

According to another embodiment of the invention, the control or regulating device is designed for controlling or regulating the fuel cell with consideration of the current flight phase. In other words, the fuel cell may be controlled or regulated depending on the current flight phase.

Since the current flight phase is taken into consideration, it may be possible to determine if the water consumption will increase or decrease in the near future. It is also possible to determine if it is even necessary to additionally fill the water tank, for example, because the water reserves in the water tank suffice for the remainder of the flight.

According to another embodiment of the invention, the fuel cell system furthermore features a condensation device, if applicable, with a downstream water separator for condensing (and separating) the water delivered by the fuel cell before it is fed to the tank. In this case, the control or regulating device is designed for controlling or regulating the fuel cell with consideration of the current efficiency of the condensation device (or of the combination of the condensation device and the water separator).

For example, it may be necessary to increase the water production rate of the fuel cell because the efficiency of the condensation device decreases (and vice versa).

According to another embodiment of the invention, the control or regulating device features a performance demand signal control that is designed for determining a nominal value for the water production capacity of the fuel cell with consideration of the current efficiency of the condensation device.

In addition to the current efficiency of the condensation devices, other measured variables may also be incorporated into the determination of the nominal value. These consist, for example, of different physical parameters such as, e.g., the cooling temperature of the condenser, the ambient pressure of the condenser and the air inflow velocity of the condenser. Corresponding sensors are provided in order to determine these different physical parameters.

According to another embodiment of the invention, the control or regulating device is designed in such a way that a continuous decrease of the efficiency of the condensation device leads to a continuous increase of the nominal value for the water production capacity of the fuel cell (and vice versa).

Alternatively, it may be provided that a continuous decrease of the efficiency leads to an erratic, i.e. step-like increase of the nominal value after the efficiency falls short of a certain threshold value, and that a continuous increase of the efficiency of the condensation device leads to an erratic, i.e. step-like, decrease of the nominal value after the efficiency exceeds a certain threshold value.

According to another embodiment of the invention, the control or regulating device features a performance demand signal limiter that is designed for limiting the nominal value for the performance of the fuel cell with consideration of the current power consumption of the electric loads aboard the means of transport and/or with consideration of a fuel supply for the fuel cell.

In this way, it may be possible to limit the performance of the fuel cell even if the upstream performance demand signal control has defined a higher nominal value.

This limitation may also be defined in dependence on the flight phase.

According to another aspect of the invention, a means of transport with a fuel cell system of the type described above and below is proposed.

The term means of transport used in this description may refer to an aircraft such as, for example, an airplane, a helicopter, an airship or a spacecraft, as well as to a land craft or a watercraft.

According to another aspect of the invention, the use of a fuel cell system of the type described above and below for supplying energy to electric loads and for producing fresh water aboard a means of transport is proposed.

According to another aspect of the invention, a method for generating electric energy and water aboard a means of transport by means of a fuel cell system of the type described above and below is proposed, wherein fuel is supplied to a fuel cell, electric energy is generated by the fuel cell and water is obtained from a waste gas of the fuel cell. The thusly obtained water is used for filling a water tank. Furthermore, the fuel cells are controlled or regulated in dependence on a current fill level or limit level of the water tank and a predicted future water consumption of consumers aboard the means of transport.

According to another embodiment of the invention, the fuel cell is controlled or regulated with consideration of a previous water consumption aboard the means of transport, a current flight phase or traveling phase of the means of transport and/or a current efficiency of a condensation device.

According to another embodiment of the invention, the nominal value for the performance of the fuel cell is limited with consideration of a current power consumption of the electric loads aboard the means of transport or a fuel supply for the fuel cell.

BRIEF DESCRIPTION OF THE DRAWINGS

Exemplary embodiments of the invention are described below with reference to the figures.

FIG. 7 shows two tables for elucidating the characteristics of the fill level control or regulating process.

FIG. 8A shows four tables for elucidating the characteristics of the performance demand signal control according to an exemplary embodiment of the invention.

DETAILED DESCRIPTION

The figures show schematic illustrations that are not true-to-scale.

In the following description of the figures, identical or similar elements are identified by the same reference symbols.

Figure 1:
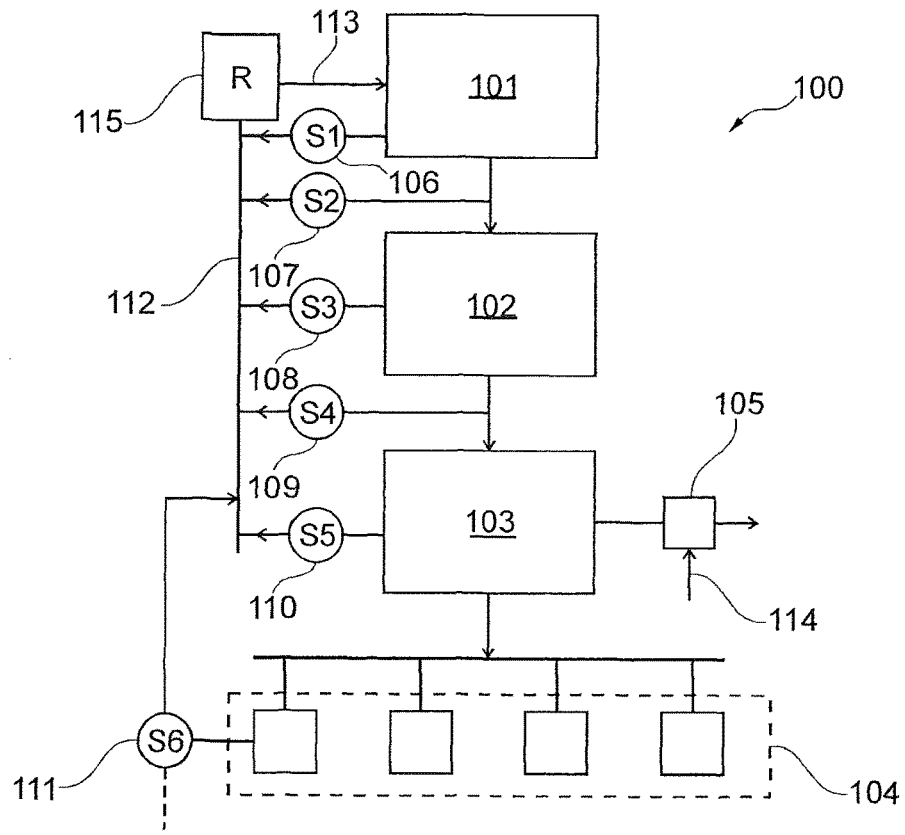
FIG. 1 shows a fuel cell system with a water supply according to an exemplary embodiment of the invention.

FIG. 1 shows a fuel cell system 100 according to an exemplary embodiment of the invention. The power supply system for distributing the electric energy generated by the fuel cell 101 to the on-board loads, i.e. consumers, is not illustrated (in this respect, see FIG. 2).

A water generation system 102 featuring, for example, one or more condensers and a water separator is arranged downstream of the fuel cell 101. The water obtained from the waste gas of the fuel cell 101 in this fashion is then fed to a water tank 103 and stored therein.

The water consumers 104 are connected to the water tank 103 by means of a corresponding pipe system. A drain valve 105 is also provided on the water tank 103 in order to prevent the water tank 103 from being overfilled. The excess water may be discharged, for example, into the surroundings of the means of transport.

Several sensors 106 to 111 are provided and measure, for example, the fill level or limit level of the water tank 103 (sensor 110), the efficiency of the water generation system 102 (sensor 108) and/or certain parameters of the fuel cell 101 (sensor 106). The waste gas rate of the fuel cell 101 can also be measured, for example, with the sensor 107. The sensor 109 measures the actual water production rate, for example, by measuring the flow through the water pipe between the water generation system 102 and the tank 103.

Other sensors 111 may be provided in order to measure the water demand and/or the energy demand of the on-board loads 104.

The control or regulating device 115 is supplied with the sensor data from the sensors 106 to 111 via a data bus 112 and controls the fuel cell 101 based on the sensor data of one or more of these sensors. For this purpose, a control line 113 is provided and connects the control or regulating device 115 to the fuel cell 101. The control or regulating device 115 can also control the drain valve 105 via the control line 114.

It should be noted that it would also be possible to provide more or fewer sensors. In a simple scenario, only a limit level sensor is provided in order to detect a limit level of the water tank 103.

The control or regulating device 115 can adjust the operating point of the fuel cell 101. The fuel cell system delivers electric energy to the on-board electrical system together with other energy generators (see FIG. 2) while the water production system delivers water into the tank 103, from which the water consumers 104 aboard the means of transport are supplied.

At this point, it should be noted that a plurality of fuel cells 101 may also be provided.

Figure 2:
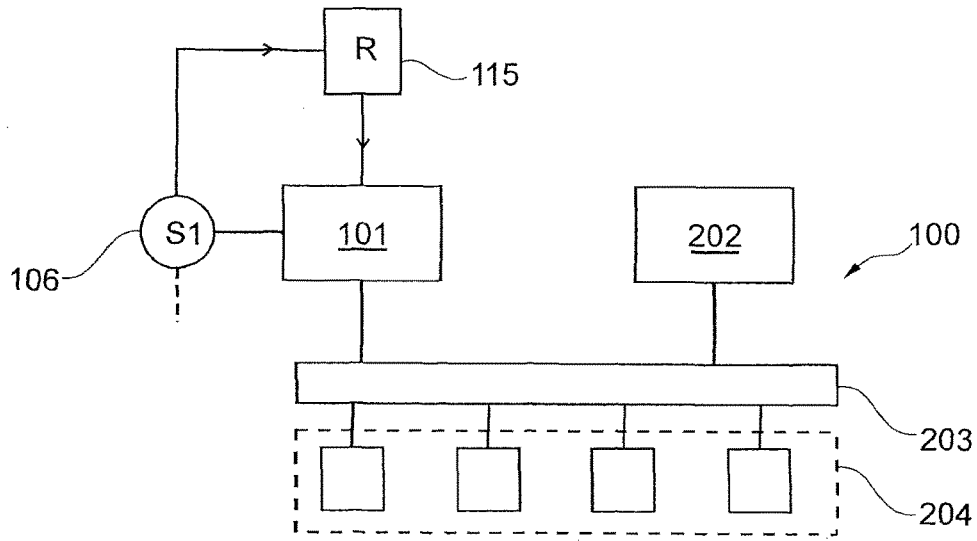
FIG. 2 shows a fuel cell system with a power supply according to an exemplary embodiment of the invention.

According to FIG. 2, additional energy generators 202 for generating electric energy may be provided and connected to the electrical network 203 of the means of transport analogous to the fuel cell 101. The electric loads 204 are supplied with electric energy via this electrical network 203.

Figure 3:
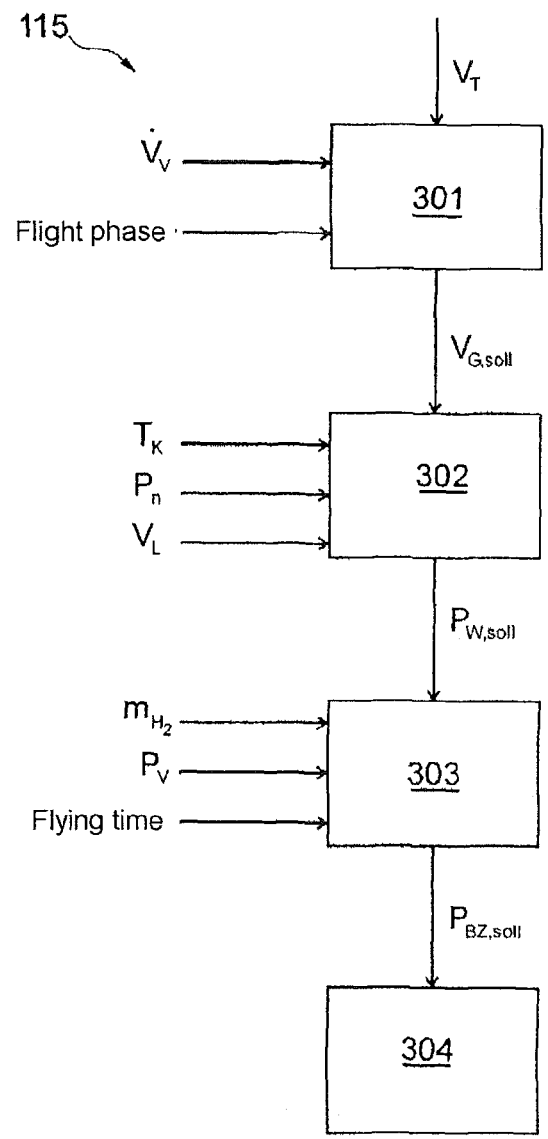
FIG. 3 shows a flow chart of a control or regulating process according to an exemplary embodiment of the invention.

FIG. 3 shows a flow chart of a regulating process according to an exemplary embodiment of the invention. The control or regulating device 115 features a tank fill level control or regulating device 301, a downstream performance demand signal control 302, a performance demand signal limiter 303 arranged downstream thereof and a fuel cell performance regulator 304 arranged downstream of the performance demand signal limiter.

The tank fill level control or regulating device 301 comprises, for example, a two-position controller that detects limit fill levels. If the lower limiting value of the water tank fill level $V_{Tu}$ is not reached, the device 301 sends a demand signal for the production of water to the performance demand signal control 302. The demand signal is once again reset once the water level in the tank rises and the upper limiting value $V_{To}$ is exceeded (see FIG. 4). If the maximum permissible fill level $V_{Tmax}$ is exceeded, a drain valve 105 opens and discharges the excess water outward into the surroundings of the means of transport (for example, of the aircraft).

The control or regulating device may be expanded in order to achieve a more precise control or regulation of the fill level in the tank $V_T$ and to operate the fuel cell at the optimal operating point, i.e., in the partial-load range, for as long as possible. In this case, the water quantity $V_V$ consumed in the last time interval and/or the current flight phase are taken into consideration. It is checked if the consumed water quantity $V_V$ exceeds a critical limiting value $V_{Vkrit}$ and if the catering for the passengers and the higher water consumption associated therewith (e.g., for the preparation of coffee or tea) will take place in the near future. A demand signal for the water quantity $V_{Gsoll}$ to be produced in the next time interval is output with the aid of a suitable calculation method in dependence on the three influencing variables tank fill level $V_T$, water consumption $V_V$ and flight phase. In this case, the signal $V_{Gsoll}$ can assume the three states "no water production," "water production at optimal operating point" or "maximum water production." One possible method is illustrated in an exemplary fashion in FIGS. 6 and 7.

The consumed water quantity can be measured, e.g., with a flow sensor in the supply pipe on the water tank outlet. Another option consists of calculating the water consumption from the opening times of the individual consumers (e.g., water faucets and flushing valves in the toilets) and the water pressure in the system.

The flight phase or the elapsed and the remaining flying time are known from the on-board computer that is also connected to the control or regulating device 115. The termination of the catering phases may either be preadjusted or input by the cabin crew during the flight.

According to FIG. 3, sensor measurement data with respect to the water tank fill level $V_T$ and the current water consumption rate $V_V$, as well as information on the flight phase, is fed to the tank fill level control or regulating device 301.

The device 301 calculates the water generation rate $V_{Gsoll}$ thereof in the form of a nominal value.

For example, information on the cooling temperature of the condenser $T_K$, the ambient pressure $P_U$ and the air inflow velocity $v_L$ may be fed to the performance demand signal control 302.

The performance demand signal control 302 translates the output signal $V_{Gsoll}$ of the tank fill level regulating device 301 into a performance demand signal $P_{Wsoll}$ for the fuel cell that is required for the water production, for example, with consideration of the efficiency of the condensation K of the condenser. The signal $V_{Gsoll}$ may assume, for example, three values that represent no water production, average water production and maximum water production.

The condensation efficiency K describes the proportion of the water actually produced in the water production system in relation to the absolute water quantity in the fuel cell waste gas. Due to the characteristics of the system, it is not possible to use the entire water quantity contained in the waste gas for the water system. The exhaust air exiting the water separator contains a residual quantity of water. The cooling temperature of the condenser $T_K$ can have the most significant operational influence on the condensation efficiency (see FIG. 5). A very high condensation efficiency is achieved at cruising altitudes and the correspondingly low outside temperatures, wherein the condensation efficiency is much lower on the ground and the correspondingly high outside temperatures. A mathematical model of the condensation efficiency K as a function of different physical parameters such as, e.g., the cooling temperature $T_K$, the ambient pressure $P_U$ and the air inflow velocity $v_L$ is stored in the performance demand signal control 302 and serves for calculating the instantaneous condensation efficiency.

Two options for calculating the performance demand for the water generation (nominal value) $P_{Wsoll}$ are described below:

1. It is determined if the instantaneous condensation coefficient K has fallen short of a limiting value $K_{krit}$. The performance demand signal $P_{Wsoll}$ required for the water production is generated in the increments "no performance demand," "performance demand at optimal operating point $P_{Bzopt}$" and "maximum performance demand $P_{BZmax}$" in dependence on the result of the aforementioned determination and in connection with the output signal $V_{Gsoll}$ of the tank fill level regulating device (see FIG. 8A).

2. In case the tank fill level regulating device 301 outputs the value "water production at optimal operating point" for the signal $V_{Gsoll}$, the output signal of the performance demand signal control $P_{Wsoll}$ may alternatively be variably adjusted between the fuel cell performance at optimal operating point $P_{Bzopt}$ and the value "maximum performance demand $P_{BZmax}$" in accordance with the following equation (see also FIG. 8B):

$$P_{Wsoll} = \frac{1}{K} P_{BZopt}$$

An advantage may be that the performance demand signal is not increased erratically, but rather continuously as the condensation efficiency decreases and the maximum value may not be reached as often.

The performance demand signal limiter 303 limits the performance demand signal $P_{Wsoll}$ required for the water production to an actual performance demand for the fuel cell $P_{BZsoll}$.

The output signal of the performance demand signal control $P_{Wsoll}$ is based exclusively on the water demand and only limited with respect to its peak value by the design-related maximum performance of the fuel cell system $P_{BZmax}$. The performance demand signal limiter 303 may receive measured values that concern the fill level of the supply tank for the fuel cell. This fill level consists, for example, of the fill level of the hydrogen tank $m_{H2}$. It may also receive data with respect to the current power demand of the loads $P_V$ and data with respect to the current flight phase and the remaining flying time.

The electric power of the fuel cell associated with the required water production is fed into the on-board network of the aircraft. In order to prevent more power than that currently consumed from being generated, the performance demand signal $P_{Wsoll}$ can be compared with the current power consumption $P_V$. If the current power consumption is exceeded, the performance demand signal for the fuel cell $P_{BZsoll}$ is limited to the actual power demand of the loads $P_V$ (see also FIG. 9).

In addition, the demand signal can be set to zero or at least reduced if the supply of fuel for the fuel cell falls short of a minimum supply, e.g., with consideration of the still remaining flying time. In this way, the availability of the fuel cell system as an energy supplier (e.g., an emergency power system) is ensured up to the end of the flight (see, for example, FIG. 9).

Since other energy generators also feed power into the on-board network, the performance demand signal for the fuel cell $P_{BZsoll}$ can be used for limiting the power to be delivered by the other energy generators to the differential amount between the instantaneous power consumption $P_V$ and the performance demand $P_{BZsoll}$.

The thusly calculated and, if applicable, limited fuel cell performance is forwarded to the fuel cell performance regulating device 304 in the form of a nominal value $P_{BZsoll}$.

Figure 4:
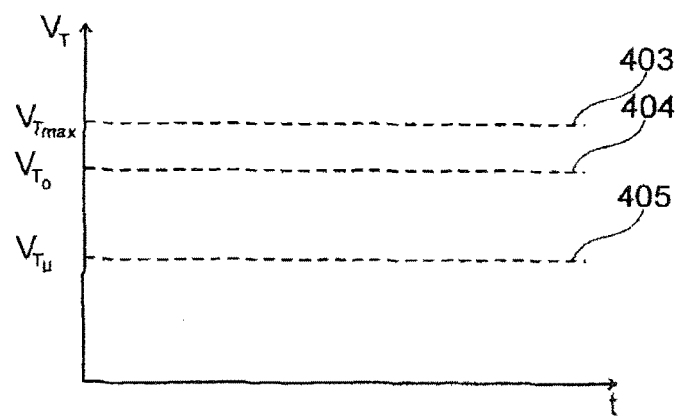
FIG. 4 shows the dependence of the maximum permissible water tank fill level, the upper limiting value of the water tank fill level and the lower limiting value of the water tank fill level on the time.

FIG. 4 shows an example of the maximum permissible tank fill level 403, the upper limiting value for the tank fill level 404 (that lies below the maximum permissible tank fill level) and the lower limiting value for the tank fill level 405 (that lies below the upper limiting value) as a function of the time. According to the exemplary embodiment shown in FIG. 4, these three fill level limiting values are not time-variant. However, it would be possible, for example, that the lower limiting value decreases over time because the remaining traveling time become shorter and shorter.

Figure 5:
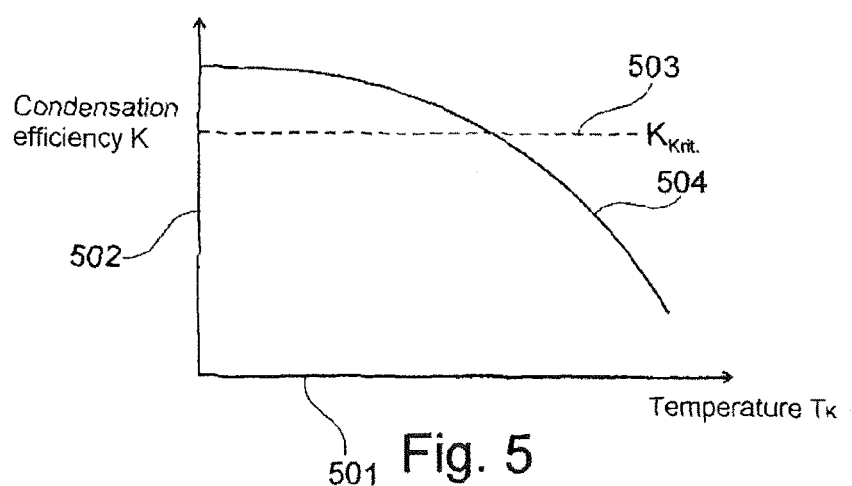
FIG. 5 shows the dependence of the condensation efficiency on the temperature of the condenser.

FIG. 5 shows the dependence of the condensation efficiency K 502 on the cooling temperature of the condenser $T_K$ 501. According to the curve 504, the condensation efficiency drops in a non-linear fashion as the temperature increases and has a value that is lower than the limiting value of the condensation efficiency $K_{krit}$ 503 above a limiting temperature.

Figure 6:
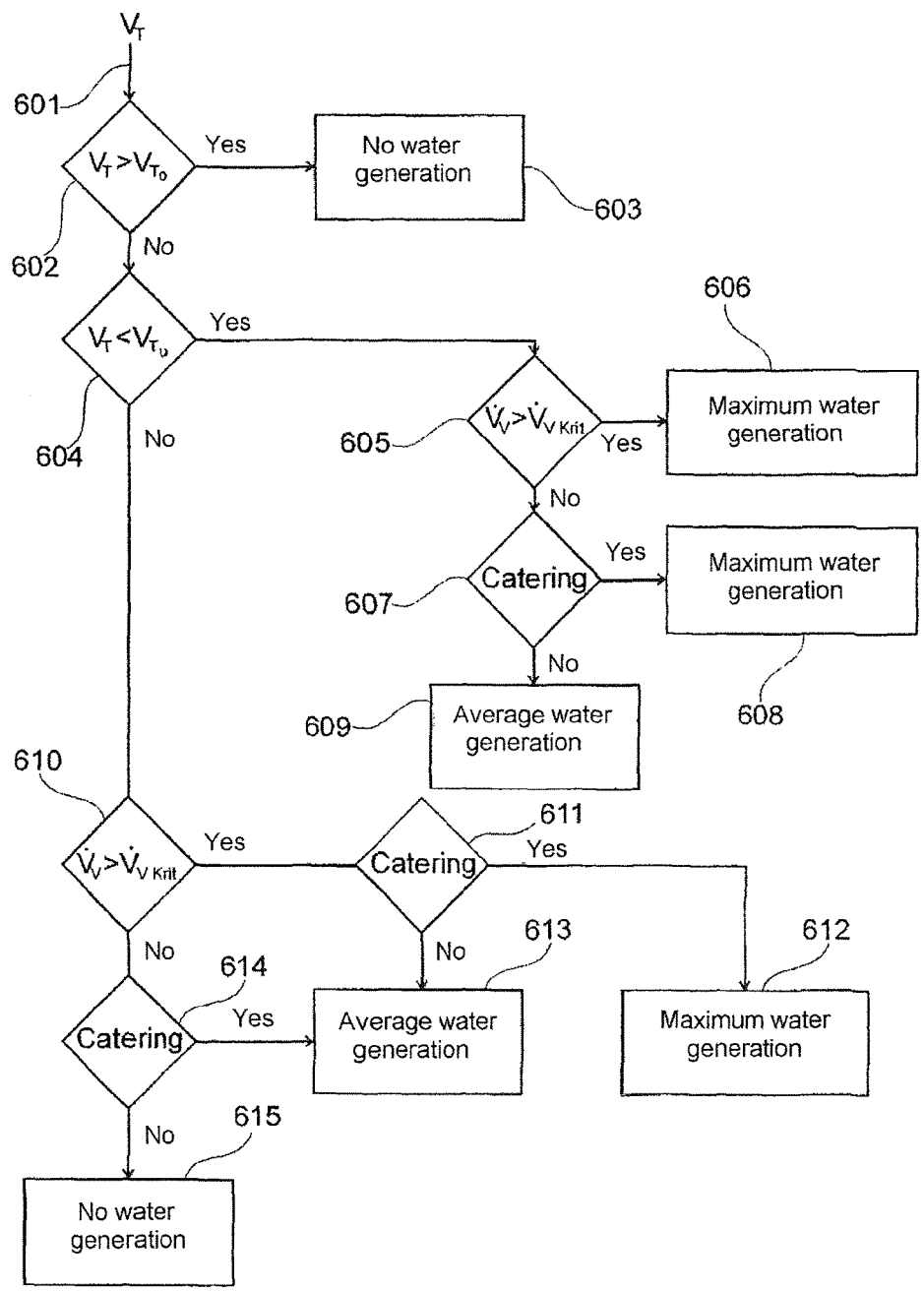
FIG. 6 shows a flowchart of a process for regulating the water tank fill level.

FIG. 6 shows a flow chart of a process for controlling or regulating the tank fill level. The tank fill level is measured in step 601 and it is determined if the measured tank fill level is higher than the upper limiting value for this fill level in step 602. If this is the case, no water generation takes place (step 603). If this is not the case, it is determined if the measured tank fill level is lower than the lower limiting value for the tank fill level in step 604.

If this is the case, it is determined if the water consumption (or the water consumption rate) in the interval in question is higher than a limiting value for the water consumption in step 605. If this is the case, the command for maximizing the water generation is output (step 606).

If this is not the case, it is determined if catering of the passengers is imminent in step 607.

If this is the case, the command for increasing the water generation to a maximum value is output (step 608).

If this is not the case, the water generation is adjusted to an average value (step 609).

If it is determined that the tank fill level does not lie below the lower limiting value in step 604, the next step to be carried out is step 610, in which it is determined if the water consumption in the interval in question is higher than a limiting value for the water consumption.

If this is the case, it is determined if catering is imminent in step 611. If this is the case, the water generation is increased to a maximum value in step 612. If this is not the case, the water generation is set to an average value in step 613.

However, if it is determined that the water consumption in the interval in question does not lie above the limiting value for the water consumption in step 610, the next step to be carried out is step 614, in which it is determined if a catering phase is imminent. If this is the case, the value for the water generation is set to an average value (see step 613). If this is not the case, it is determined that no water generation should take place in step 615.

FIG. 7 shows two tables for elucidating the characteristics of the tank fill level control process. If the current tank fill level lies above the upper limiting value for the tank fill level (value 0), the command that no water should be produced is output.

If the current tank fill level lies between the lower limiting value and the upper limiting value (value 1), the water consumption in the interval in question lies below the corresponding limiting value (value 0) and no catering is planned in the near future (value 0), the command that no water should be produced is output (see second line of the first table). Accordingly, it is also determined if the command for producing water should be output with an average production rate or a maximum production rate as already described above with reference to FIG. 6.

FIG. 8A shows several tables that elucidate how the performance demand signal control according to the exemplary embodiment described above under option 1 can be operated. In this case, the determination of the performance demand signal $P_{Wsoll}$ required for the water production takes place erratically. In column 1 of the upper table, the value 0 means that the nominal value for the water production is 0. The value 1 means that the nominal value for the water production assumes an average value, and the value 2 means that the nominal value for the water production assumes a maximum value. In the second column, the value 0 means that the condensation efficiency lies below a limiting value and the value 1 means that the condensation efficiency lies above this limiting value.

In the third column, the value 0 means that the performance demand signal $P_{Wsoll}$ required for the water production is 0, the value 1 means that the performance demand signal has an average value (at which the fuel cell operates at the optimal operating point) and the value 2 means that the performance demand signal has a maximum value, at which the fuel cell delivers maximum power.

For example, if the nominal value for the water production is set to an average value ($V_{Gsoll}$=1) and the condensation efficiency lies below the critical value (K =0), the performance demand signal is set to its maximum ($P_{Wsoll}$=2).

Figure 8B:
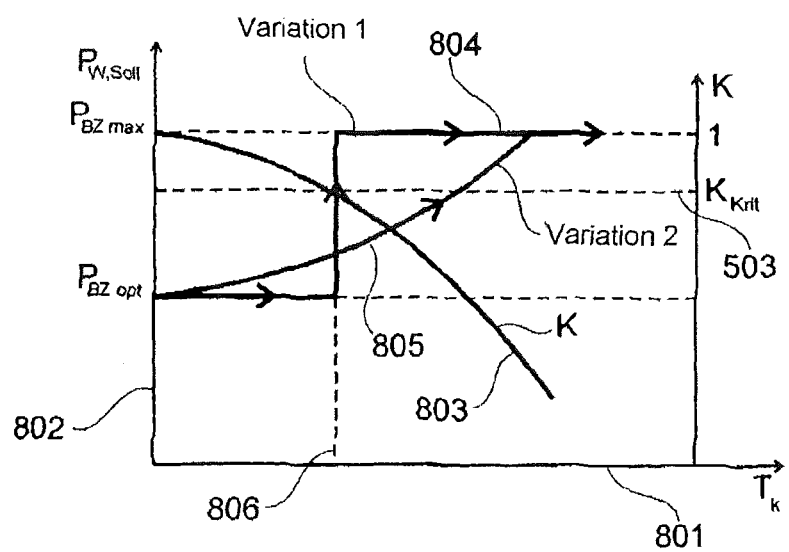
FIG. 8B shows a diagram for elucidating the characteristics of the performance demand signal control according to another exemplary embodiment of the invention.

FIG. 8B shows the dependence of the performance demand signal 802 on the cooling temperature of the condenser 801. In this case, the erratic curve 804 corresponds to the first exemplary embodiment and the curve 805 corresponds to the second exemplary embodiment, in which $P_{Wsoll}$ is continuously adjusted.

The curve 803 shows the dependence of the condensation efficiency on the cooling temperature of the condenser.

Figure 8C:
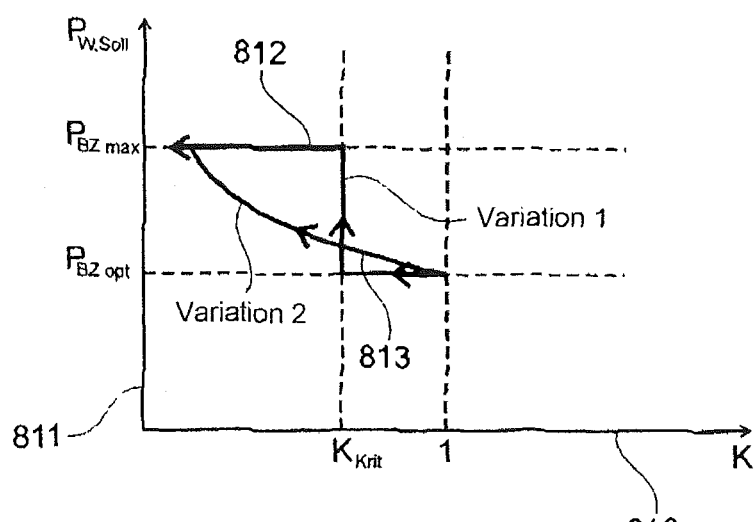
FIG. 8C shows a diagram for elucidating the characteristics of the performance demand signal control according to the exemplary embodiment of FIG. 8B.

FIG. 8C shows the dependence of the performance demand signal 811 on the condensation efficiency 810. The curve 812 shows the erratic dependence according to exemplary embodiment 1 and the curve 813 shows the continuous dependence according to exemplary embodiment 2 (see above).

Figure 9:
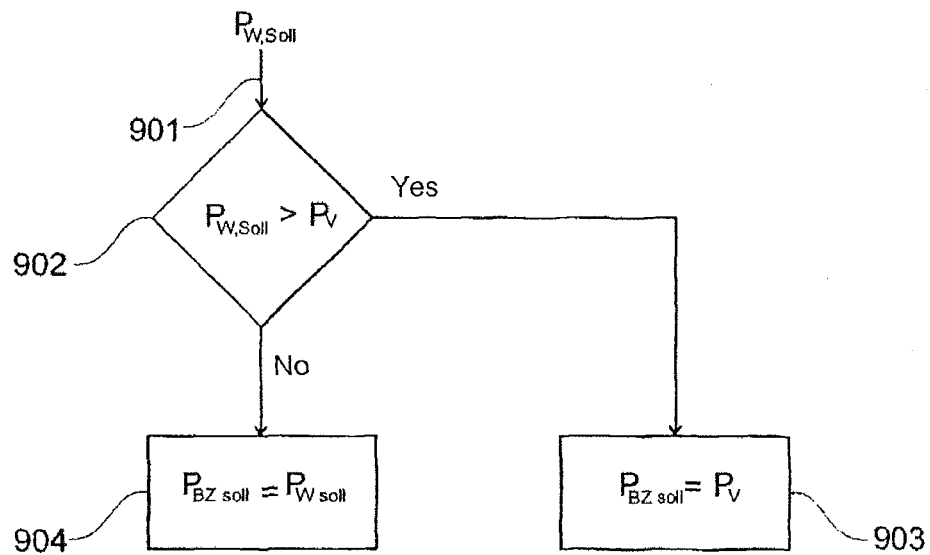
FIG. 9 shows a flow chart of a performance demand signal limiting process according to an exemplary embodiment of the invention.
Figure 9:
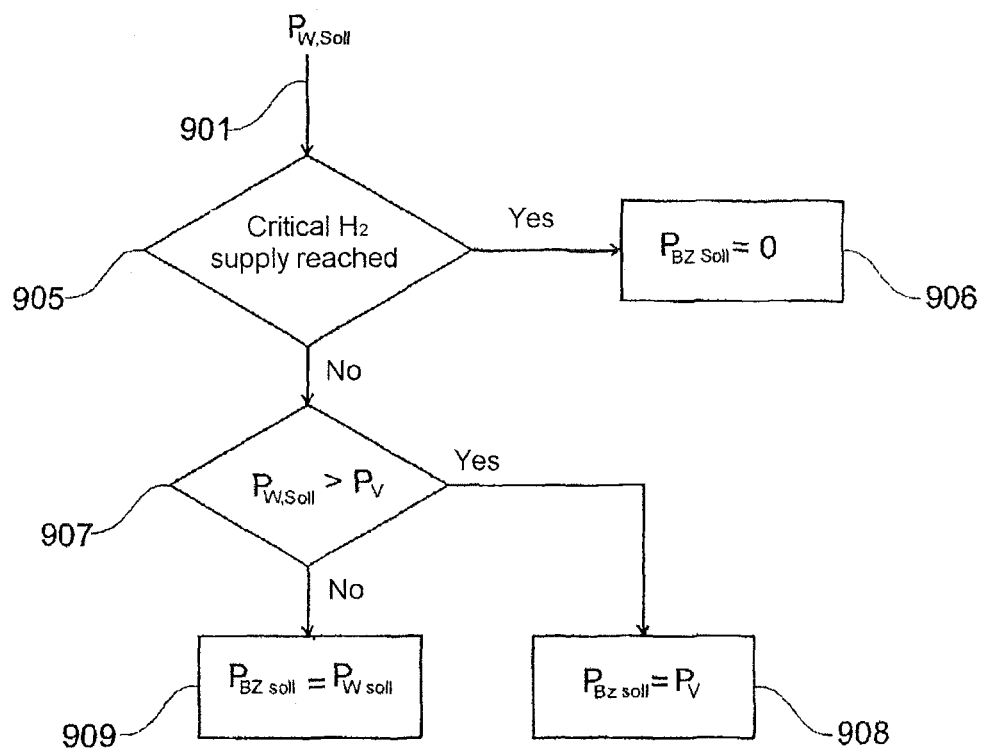

FIG. 9 shows a flow chart of a performance demand signal limiting process. The performance demand signal $P_{Wsoll}$ required for the water production is output in step 901 and this signal is compared with the instantaneous power consumption of the electric loads in step 902. If $P_{Wsoll}$ is higher than the instantaneous power consumption $P_V$, the actual performance demand for the fuel cell is set to the instantaneous power consumption in step 903. If this is not the case, the actual performance demand for the fuel cell is set to $P_{Wsoll}$ in step 904.

It can furthermore be determined if a critical hydrogen supply has been reached in step 905. If this is the case, $P_{BZsoll}$ (i.e., the actual performance demand for the fuel cell) is set to 0 in step 906. If this is not the case, $P_{Wsoll}$ is compared with the instantaneous power consumption $P_V$ in step 907. If $P_{Wsoll}$ is higher than $P_V$, the actual performance demand for the fuel cell is set to the instantaneous power consumption $P_V$ in step 908. If this is not the case, the actual performance demand for the fuel cell is set to $P_{Wsoll}$ in step 909.

Figure 10:
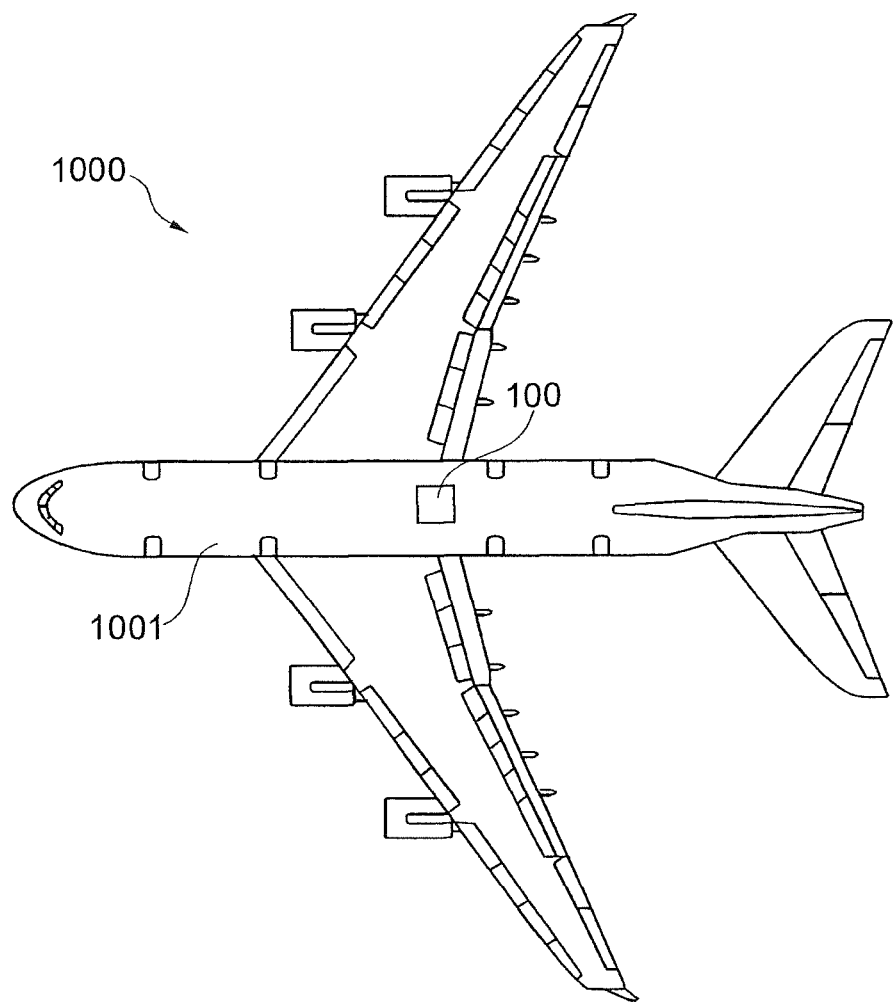
FIG. 10 shows an aircraft according to an exemplary embodiment of the invention.

FIG. 10 shows an aircraft 1000 according to an exemplary embodiment of the invention. The aircraft 1000 features a fuselage 1001, into which a fuel cell system 100 is installed.

As a supplement, it should be noted that "comprising" and "featuring" do not exclude any other elements or steps, and that "a" or "an" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

The invention claimed is:

1. A fuel cell system for generating electric energy and water for use aboard a means of transport, with the fuel cell system comprising:
   a fuel cell;
   a water tank for storing water delivered by the fuel cell;
   a control device configured to control operation of the fuel cell in dependence on a current fill level or limit level of the water tank and on a predicted future water consumption based on flight phase and remaining flight time.

2. The fuel cell system of claim 1,
   wherein the control device is further configured to control the fuel cell in dependence on a previous water consumption.

3. The fuel cell system of claim 1,
   wherein the control device comprises a fill level control device with a fill level sensor or a limit level sensor.

4. The fuel cell system of claim 1, further comprising:
   a condensation device configured to condense the water delivered by the fuel cell before the water is fed to the tank;
   wherein the control device is configured to control the fuel cell based on efficiency of the condensation device.

5. The fuel cell system of claim 4,
   wherein the control device comprises a performance demand signal control configured to determine a nominal value for the water production rate of the fuel cell based on efficiency of the condensation device.

6. The fuel cell system of claim 5,
   wherein a decrease of the efficiency of the condensation device leads to an increase of the nominal value.

7. The fuel cell system of claim 1,
   wherein the control device comprises a performance demand signal limiter configured to limit the nominal value for the performance of the fuel cell based on power consumption of electric consumers aboard the means of transport or fuel supply for the fuel cell.

8. A means of transport with a fuel cell system, the fuel cell system comprising:
   a fuel cell;
   a water tank for storing water delivered by the fuel cell;
   a control device configured to control the fuel cell in dependence on a current fill level or limit level of the water tank and on a predicted future water consumption based on flight phase and remaining flight time.

9. The means of transport of claim 8, wherein the means of transport comprises an aircraft.

10. A method for generating electric energy and water aboard a means of transport by a fuel cell system, with said method comprising:
    supplying fuel to a fuel cell;
    generating electric energy by the fuel cell;
    obtaining water from waste gas of the fuel cell;
    filling a water tank with the obtained water;
    controlling the fuel cell in dependence on a current fill level or limit level of the water tank and on a predicted future water consumption based on flight phase and remaining flight time.

11. The method of claim 10, further comprising:
    controlling the fuel cell based on previous water consumption.

12. The method of claim 10, further comprising:
    controlling or regulating the fuel cell based on efficiency of a condensation device.

13. The method of claim 10, further comprising:
    limiting a nominal value for the performance of the fuel cell based on power consumption of electric consumers aboard the means of transport or with consideration of a fuel supply for the fuel cell.

* * * * *